US009425684B2

(12) United States Patent
Choi et al.

(10) Patent No.: US 9,425,684 B2
(45) Date of Patent: Aug. 23, 2016

(54) REDUCED NOISE POWER CONVERTER USING NOVEL SHIELD

(71) Applicant: Marvell World Trade Ltd., St. Michael (BB)

(72) Inventors: Jinho Choi, Saratoga, CA (US); Tuyen Doan, San Jose, CA (US); Yee-Huan Ng, Fremont, CA (US); Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 121 days.

(21) Appl. No.: 14/176,433

(22) Filed: Feb. 10, 2014

(65) Prior Publication Data
US 2014/0239825 A1    Aug. 28, 2014

Related U.S. Application Data

(60) Provisional application No. 61/768,112, filed on Feb. 22, 2013.

(51) Int. Cl.
*H02M 1/44* (2007.01)
*H05B 33/08* (2006.01)
(Continued)

(52) U.S. Cl.
CPC ........ *H02M 1/44* (2013.01); *H02M 1/14* (2013.01); *H02M 3/1582* (2013.01); *H05B 33/0815* (2013.01); *H02M 2001/0064* (2013.01)

(58) Field of Classification Search
CPC .......... H05B 33/0803; H05B 33/0815; H05B 41/2827; H02M 3/1582; H02M 1/14; H02M 7/062; H02M 2001/0064; H02M 2001/0032; H02M 1/4225; H02M 3/33507; H01F 27/34; H01F 27/362; H01F 27/306

USPC ............ 315/185 R, 247, 276, 291, 307, 312; 323/259, 271, 282, 311; 363/44, 21.08, 363/16, 97; 336/180, 182
See application file for complete search history.

(56) References Cited

U.S. PATENT DOCUMENTS 5,359,281 A * 10/1994 Barrow .................... H02M 1/36
                                                        323/284
6,545,883 B2 * 4/2003 Xing ................... H02M 3/33592
                                                        363/132

(Continued)

FOREIGN PATENT DOCUMENTS

EP      2 184 748 A2    5/2010
EP      2 184 748 A3    5/2010
(Continued)

OTHER PUBLICATIONS

International Search Report and Written Opinion of the International Searching Authority issued Sep. 1, 2014, in PCT/US2014/015816.
(Continued)

*Primary Examiner* — Haissa Philogene

(57) ABSTRACT

Power converters that produce less noise are disclosed. For example, in an embodiment, power converter can include a first inductor magnetically coupled to a second inductor, wherein a first end of the second inductor is electrically open and a second end of the second inductor is electrically coupled to ground via a second capacitor, a transistor electrically connected to the first inductor, and control circuitry to control switching of the transistor, wherein when the transistor is repeatedly switched on and off by the control circuitry, a current loop is formed through the transistor, the second capacitor, the first inductor and the second inductor, the current loop causing a reduced amount of switching noise to be generated by the power converter.

17 Claims, 3 Drawing Sheets

(51) Int. Cl.
*H02M 1/14* (2006.01)
*H02M 3/158* (2006.01)
*H02M 1/00* (2006.01)

(56) References Cited

U.S. PATENT DOCUMENTS

| | | | | |
|---|---|---|---|---|
| 6,788,033 B2* | 9/2004 | Vinciarelli | .......... | H02M 3/1582 323/225 |
| 7,561,446 B1* | 7/2009 | Vinciarelli | .............. | H02M 1/34 363/16 |
| 7,898,377 B2* | 3/2011 | Sicong | ................. | H01F 27/362 336/180 |
| 8,023,294 B2* | 9/2011 | Ryan | ....................... | H02M 1/14 323/335 |
| 8,203,283 B2* | 6/2012 | Hoogzaad | .......... | H05B 33/0803 315/185 R |
| 2008/0247206 A1 | 10/2008 | Park et al. | | |

FOREIGN PATENT DOCUMENTS

WO    WO 03/098788 A1    11/2003
WO    WO 2011/097945 A1    8/2011

OTHER PUBLICATIONS

M.O. Crosato, et al., "Minimising Conducted Common Mode EMI by Charge Balancing in a Non Isolated DC-DC Converter", 35$^{TH}$ Annual IEEE Power Electronics Specialists Conference, XP 010739406, Jun. 20-25, 2004, pp. 4146-4151.

* cited by examiner

REDUCED NOISE POWER CONVERTER USING NOVEL SHIELD

INCORPORATION BY REFERENCE

This application claims the benefit of U.S. Provisional Application No. 61/768,112 entitled "Transformer shield to mitigate common-mode noise due to interwinding capacitance in non-isolated power supply" filed on Feb. 22, 2013, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High-efficiency switch-mode power converters operate at high switching frequencies with the benefit of smaller component sizes (e.g., transformers and inductors) and optimal efficiency. However, these benefits come at the cost of increased electromagnetic interference (EMI). Rapidly changing voltage and current signals in a power converter will internally induce unwanted noise through mutual inductance or capacitive coupling between circuit elements. One way noise propagates out of a switch-mode power converter (for frequencies less than 30 MHz) is backward through the power lines supplying power to the power converter, which then act as radiating EMI sources.

SUMMARY

Various aspects and embodiments of the invention are described in further detail below.

In an embodiment, a power converter includes a first inductor having a first end and a second end, the first inductor being electrically connected to a direct-voltage power source at the first end, and electrically connected to a first power lead of a transistor and an anode of a diode at the second end, a first capacitor having a first end and a second end, the first capacitor being electrically coupled to the direct-voltage power source at the first end of the first capacitor and electrically coupled to a cathode of the diode at the second end the first capacitor, a second inductor having a first end and a second end and magnetically coupled to the first inductor, wherein the first end of the second inductor is electrically open and the second end of the second inductor is electrically coupled to ground via a second capacitor, and control circuitry to control switching of the transistor.

In another embodiment, a power converter includes a first inductor having a first end and a second end, the first inductor being electrically connected to a first capacitor at the first end, and electrically connected to a first power lead of a transistor and an anode of a diode at the second end, a second inductor having a first end and a second end and magnetically coupled to the first inductor, wherein the first end of the second inductor is electrically open and the second end of the second inductor is electrically coupled to ground via a second capacitor, and control circuitry to control switching of the transistor.

In yet another embodiment, a power converter includes a first inductor magnetically coupled to a second inductor, wherein a first end of the second inductor is electrically open and a second end of the second inductor is electrically coupled to ground via a second capacitor, a transistor electrically connected to the first inductor, and control circuitry to control switching of the transistor, wherein when the transistor is repeatedly switched on and off by the control circuitry, a current loop is formed through the transistor, the first inductor, the second inductor and the second capacitor, the current loop causing a reduced amount of switching noise to be generated by the power converter.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

This disclosure describes a way to effectively reduce the amount of common-mode current generated by a power converter without using a two-stage input filter. The solution involves a shield in the form of a transformer winding in which one end is electrically open and the other end is connected to the converter's return line (i.e., ground) through a capacitor. This winding helps to divert the common-mode noise away from power lines by keeping the common-mode noise localized within the power converter.

Figure 1:
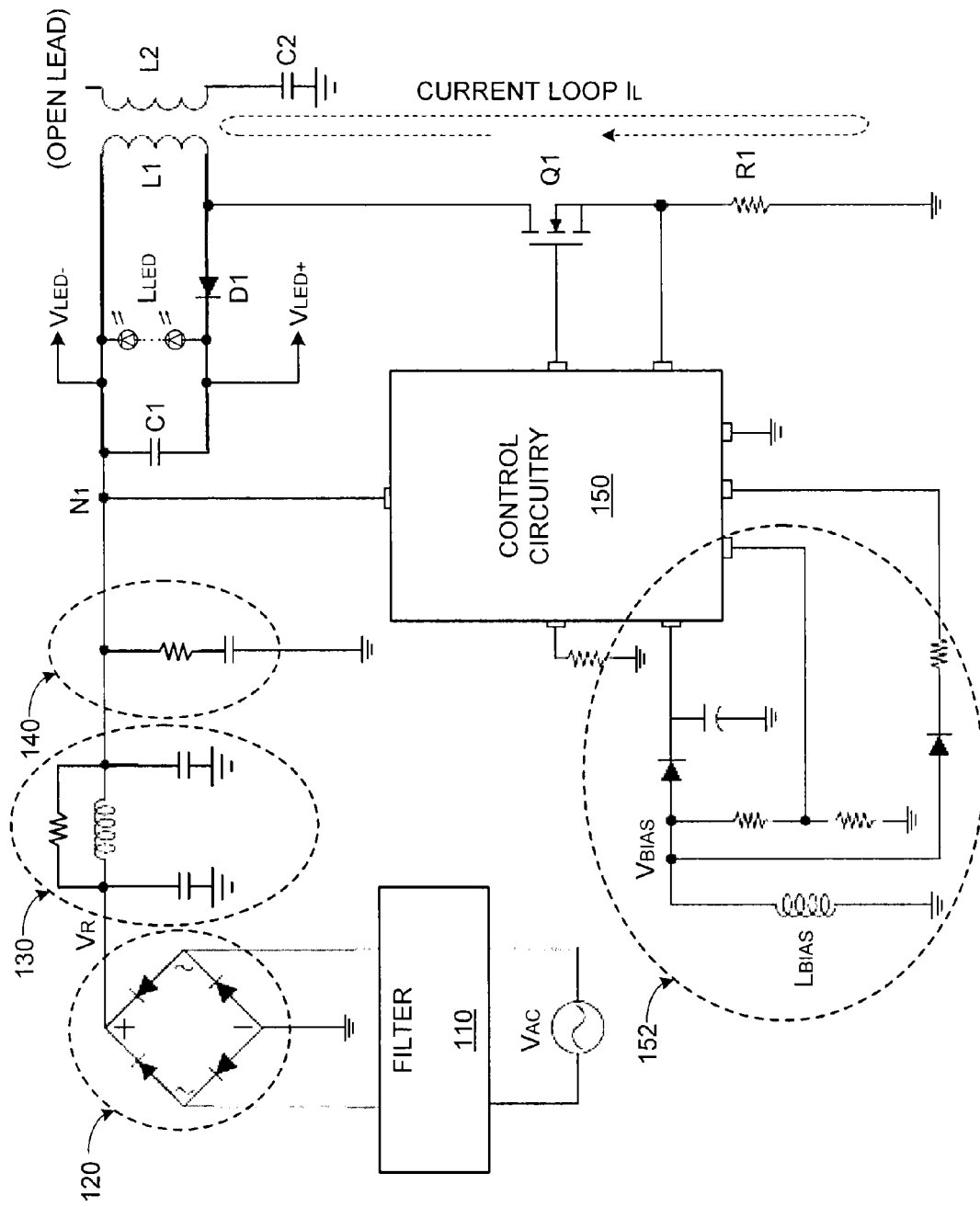
FIG. 1 is an example buck-boost power converter modified to reduce electromagnetic interference (EMI) using an inductive shield.

FIG. 1 is an example buck-boost power converter modified to reduce electromagnetic interference (EMI) using an inductive shield. As shown in FIG. 1, the power converter includes a first filter 110, a rectifier 120, a second filter 130, a third filter 140, control circuitry 150 with associated bias circuitry 152, a first inductor L1, a second inductor L2 magnetically coupled to the first inductor L1, a first capacitor C1, a second capacitor C2, a diode D1, a transistor Q1, a resistor R1, and a Light-Emitting Diode (LED) load $L_{LED}$.

It is to be appreciated that the example control circuitry 150 of FIG. 1 can be an LED driver capable of driving LED load $L_{LED}$, and that the associated bias circuitry 152 conforms with manufacturer recommendations. However, the control circuitry 150 and associated bias circuitry 152 of FIG. 1 are to be considered a non-limiting example, and it is to be recognized to those of ordinary skill in the art in light of the present disclosure that the control circuitry 150 can take near limitless forms so long as the basic switch-control functionality usable for a power converter is provided.

In operation, alternating current (AC) power is provided to the rectifier 120 through the first filter 110. The rectifier 120 uses the AC power to develop a rectified voltage $V_R$. Current then passes through filters 130 and 140 to node $N_1$ where the first inductor L1, the capacitor C1, the diode D1, the transistor Q1, the resistor R1 and the control circuitry 150 are configured as a buck-boost power converter. That is, the control circuitry 150 causes transistor Q1 to switch on and off at a desired frequency so as to cause the first inductor L1 and the diode D1 to develop a working voltage across the first capacitor C1, which in turn can be used to provide power to a load, such as two or more light-emitting diode (LEDs) placed in series. While the example of FIG. 1 uses a buck-boost topology, it is to be appreciated that any other known or later developed power topology may be employed.

During operation, the constant switching of transistor Q1 produces a large voltage swing dV/dt across the first inductor L1. Due to a parasitic coupling between the first inductor L1 and the shield windings (i.e., the second inductor L2), this rapidly changing voltage will drive a current $I_P$ proportionally across a parasitic interwinding capacitor $C_P$ (not shown in FIG. 1) based on the equation $I_P = C_P * dV/dt$. Since the second inductor L2 is connected to the return path (i.e., ground) of the power supply, most of the common-mode current is prevented from being conducted back into the power line. Instead, when the transistor Q1 is repeatedly switched on and off, a current loop $I_L$ is formed through the resistor R1, the transistor Q1, the first inductor L1, the second inductor L2 and the second capacitor C2. It is this current loop $I_L$ that causes a reduced amount of switching noise to be generated by the power converter.

For this solution to be most effective, the second capacitor C2 should be as close to both the ground (or other return) and the second inductor L2 as possible or practical. This will appreciably reduce loop impedance, especially parasitic inductance, and ensure a shortest path for common-mode current.

Using the above-described approach, there is less noise available to be injected to power leads providing power to the power converter. Thus, less filtering is required and the second (pi-topology) filter 130 can be made with a substantially smaller (and less expensive) components.

Figure 2:
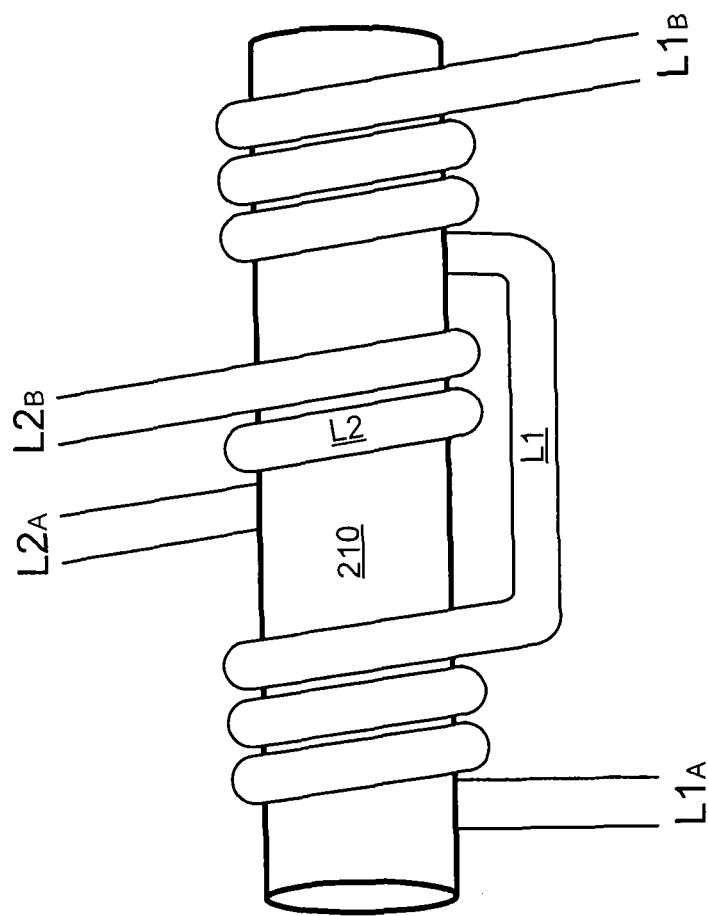
FIG. 2 is an example inductor with inductive shielding usable with the power converter of FIG. 1.

FIG. 2 is an example inductor L1 with inductive shielding usable for the power converter of FIG. 1. As shown in FIG. 2, a ferrite core 220 (or equivalent device) is provided with windings of the first inductor L1 (having ends $L1_A$ and $L1_B$) separated by windings of the second inductor L2 (having ends $L1_A$ and $L1_B$). Inductor ends $L1_A$ and $L1_B$ are connected to a power converter. Inductor end $L1_A$ is electrically open while inductor end $L1_B$ is capacitively coupled to ground (or another return line).

The number of windings for each inductor L1 and L2 can vary as may be found necessary or otherwise desirable. However, it is envisioned that at least one winding of the second inductor L2 will occur between half-windings (or more) of the first inductor L1. Other embodiments, however, will not be limited to the general winding paradigm of FIG. 2. For example, windings of inductor L2 may be placed entirely to one side of windings of inductor L1, or alternatively windings of inductor L2 may be placed over the windings of inductor L1 such that inductor L2 does not make contact with the core 220.

Figure 3:
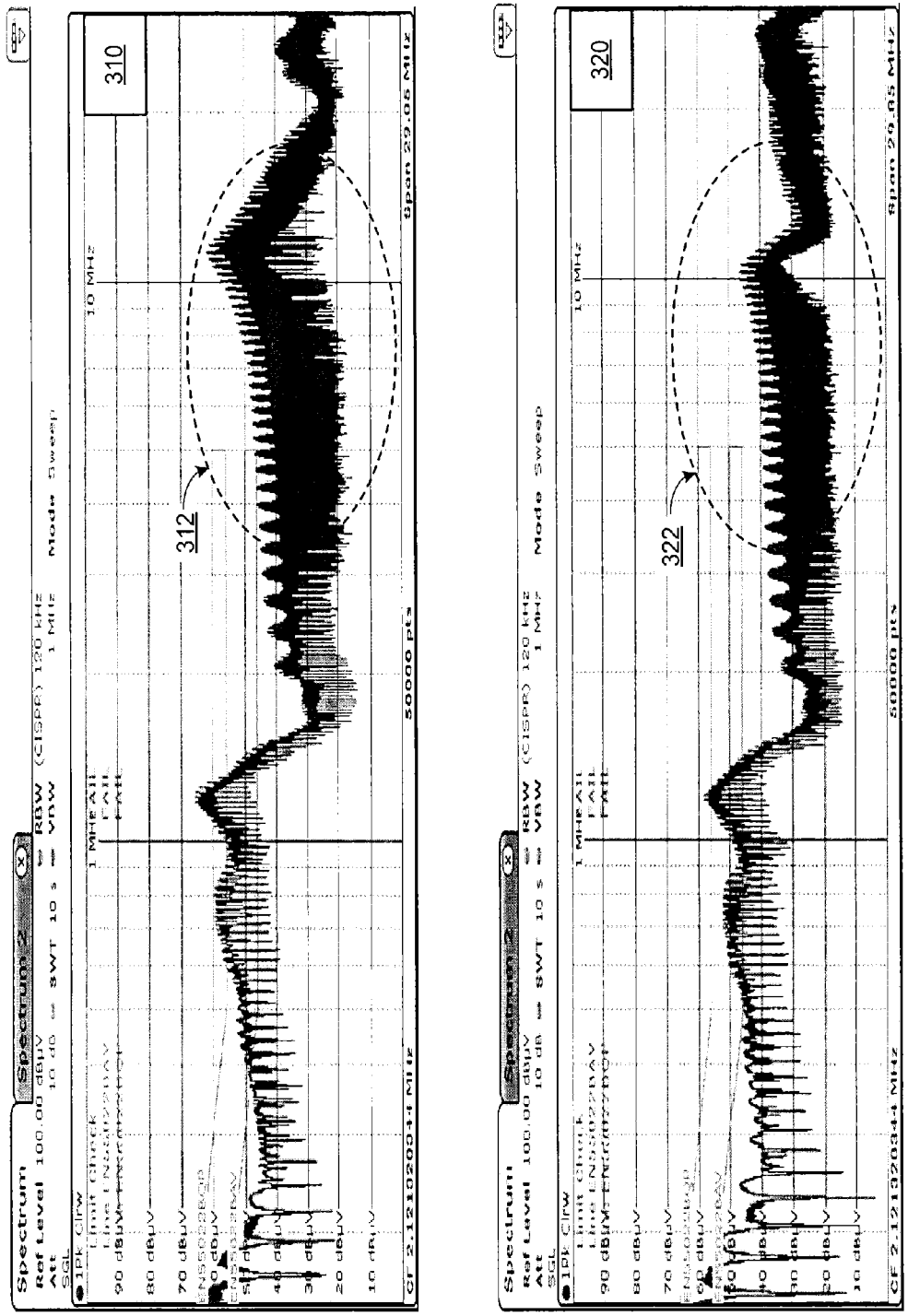
FIG. 3 depicts EMI test results of the modified buck-boost power converter shown in FIG. 1.

FIG. 3 depicts EMI test results of the modified buck-boost power converter shown in FIG. 1. Graph 310 (above) depicts EMI test results of the circuit of FIG. 1 without using an inductive shield (i.e., without inductor L2 and capacitor C2) while graph 320 (below) depicts EMI test results of the circuit of FIG. 1 using an inductive shield. As shown in respective regions 312 and 322, the noise reduction is substantially improved using the inductive shield, with peak noise reduction approaching 15db at about the ten megahertz region.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A power converter, comprising:
   a first inductor having a first end and a second end, the first inductor being electrically connected to a direct-voltage power source at the first end, and electrically connected to a first power lead of a transistor and an anode of a diode at the second end;
   a first capacitor having a first end and a second end, the first capacitor being electrically coupled to the direct-voltage power source at the first end of the first capacitor, and electrically coupled to a cathode of the diode at the second end the first capacitor;
   a second inductor having a first end and a second end and magnetically coupled to the first inductor, wherein the first end of the second inductor is electrically open and the second end of the second inductor is electrically coupled to ground via a second capacitor; and
   control circuitry to control switching of the transistor.

2. The power converter of claim 1, wherein when the transistor is repeatedly switched on and off, a current loop is formed through the transistor, the first inductor, the second inductor, and the second capacitor, the current loop causing a reduced amount of switching noise to be generated by the power converter.

3. The power converter of claim 2, wherein the second capacitor is placed in close proximity to the second inductor and to ground so as to appreciably minimize parasitic impedance within the current loop.

4. The power converter of claim 2, further comprising a ferrite core that magnetically couples the first inductor and the second inductor.

5. The power converter of claim 4, wherein at least one winding of the second inductor occurs between at least half-windings of the first inductor.

6. The power converter of claim 1, further comprising two or more light-emitting diodes coupled in series between the first end of the first capacitor and the first end of the second capacitor.

7. A power converter, comprising:
   a first inductor having a first end and a second end, the first inductor being electrically connected to a first capacitor at the first end, and electrically connected to a first power lead of a transistor at the second end;
   a second inductor having a first end and a second end and magnetically coupled to the first inductor, wherein the first end of the second inductor is electrically open and the second end of the second inductor is electrically coupled to ground via a second capacitor; and
   control circuitry to control switching of the transistor, wherein when the transistor is repeatedly switched on and off, a current loop is formed through the transistor, the first inductor, the second inductor and the second capacitor, the current loop causing a reduced amount of switching noise to be generated by the power converter.

8. The power converter of claim 7, wherein the first inductor, a diode, the first capacitor and the transistor are configured so as to provide a buck-boost power converter, wherein an anode of the diode is electrically connected to the second end of the first inductor.

9. The power converter of claim 7, further comprising two or more light-emitting diodes coupled in series between the first end of the first capacitor and the second end of the first capacitor.

10. The power converter of claim 7, wherein the second capacitor is placed in close proximity to the second inductor and to ground so as to appreciably minimize parasitic impedance within the current loop.

11. The power converter of claim 7, further comprising one or more noise filters electrically coupled to the first inductor and configured to reduce an amount of noise generated by the power converter to power leads providing power to the power convert.

12. The power converter of claim 7, further comprising a ferrite core that magnetically couples the first inductor and the second inductor.

13. The power converter of claim 12, wherein at least one winding of the second inductor occurs between at least half-windings of the first inductor.

14. A power conversion method, comprising:
rectifying an input voltage to provide a direct-voltage power source leading to a power converter that includes a first inductor electrically coupled to a transistor, and a second inductor magnetically coupled to the first inductor, wherein a first end of the second inductor is electrically open and a second end of the second inductor is electrically coupled to ground via a capacitor; and
switching the transistor so as to provide an output voltage, wherein when the transistor is repeatedly switched on and off, a current loop is formed through the transistor, the first inductor, the second inductor and the capacitor, the current loop causing a reduced amount of switching noise to be generated by the power converter.

15. The power conversion method of claim 14, wherein a ferrite core magnetically couples the first inductor and the second inductor.

16. The power conversion method of claim 15, wherein at least one winding of the second inductor occurs between at least half-windings of the first inductor.

17. The power conversion method of claim 14, further comprising powering at least two or more light-emitting diodes using the output voltage.

* * * * *